United States Patent
Son et al.

(10) Patent No.: US 9,137,752 B2
(45) Date of Patent: Sep. 15, 2015

(54) METHOD FOR OPERATING CONTROL SLEEP MODE IN A COMMUNICATION SYSTEM

(75) Inventors: Yeong-Moon Son, Yongin-si (KR);
Kang-Gyu Lee, Yongin-si (KR);
Jung-Je Son, Yongin-si (KR);
Geun-Hwi Lim, Seongnam-si (KR);
Jae-Hyuk Jang, Suwon-si (KR);
Jin-Hyun Youn, Hanam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 578 days.

(21) Appl. No.: 12/682,672

(22) PCT Filed: Oct. 20, 2008

(86) PCT No.: PCT/KR2008/006194
§ 371 (c)(1),
(2), (4) Date: Apr. 12, 2010

(87) PCT Pub. No.: WO2009/051458
PCT Pub. Date: Apr. 23, 2009

(65) Prior Publication Data
US 2010/0220641 A1    Sep. 2, 2010

(30) Foreign Application Priority Data

Oct. 19, 2007  (KR) ......................... 10-2007-0105832
Jul. 5, 2008  (KR) ......................... 10-2008-0065185

(51) Int. Cl.
*H04W 52/02*    (2009.01)
(52) U.S. Cl.
CPC ............ *H04W 52/0241* (2013.01); *Y02B 60/50* (2013.01)
(58) Field of Classification Search
CPC ............ H04W 52/0241; H04W 52/02; H04W 52/0261; H04W 52/0245; H04W 52/0251
USPC ........... 370/311, 318, 328; 455/574, 458, 434
See application file for complete search history.

(56) References Cited

U.S. PATENT DOCUMENTS 6,108,542 A    8/2000  Swanchara et al.
6,622,251 B1 *  9/2003  Lindskog et al. ............. 713/300
(Continued)

FOREIGN PATENT DOCUMENTS

CN    1552168 A    12/2004
CN    1592292 A    3/2005
(Continued)

OTHER PUBLICATIONS

Changhoi Koo, Sohyun Kim, Yeongmoon Son, Jungje Son, IEEE 802. 16e Sleep Mode Enhancement, IEEE C802. 16e-03/31, The IEEE 802. 16 Working Group on Broadband Wireless Access Standards, May 13, 2003.
(Continued)

*Primary Examiner* — Rasheed Gidado
(74) *Attorney, Agent, or Firm* — Jefferson IP Law, LLP

(57) ABSTRACT

A method for controlling a sleep mode operation by a Mobile Station (MS) in a communication system. The MS includes transitioning to an awake state in a listening interval of the sleep mode; performing any one of a first operation, a second operation and a third operation in the awake state; and after any one operation is performed, transitioning to a sleep state upon detecting that there is no data to transmit to the BS and there is no data to be received from the BS. The first operation is a process of receiving data from the BS, the second operation is a process of transmitting data to the BS, and the third operation is a process of receiving data from the BS and receiving data from the BS.

22 Claims, 4 Drawing Sheets

(56) References Cited

U.S. PATENT DOCUMENTS

| | | | |
|---|---|---|---|
| 7,130,668 B2* | 10/2006 | Chang et al. | 455/574 |
| 7,430,421 B2* | 9/2008 | Park | 455/456.1 |
| 7,522,553 B2* | 4/2009 | Kang et al. | 370/328 |
| 7,548,519 B2 | 6/2009 | Motegi et al. | |
| 7,653,022 B2* | 1/2010 | Kang et al. | 370/328 |
| 7,904,122 B2* | 3/2011 | Kim et al. | 455/574 |
| 2004/0254980 A1 | 12/2004 | Motegi et al. | |
| 2005/0049012 A1* | 3/2005 | Chang et al. | 455/574 |
| 2005/0070340 A1* | 3/2005 | Kim | 455/574 |
| 2005/0122936 A1* | 6/2005 | Son et al. | 370/331 |
| 2005/0128990 A1* | 6/2005 | Eom et al. | 370/338 |
| 2005/0197171 A1* | 9/2005 | Son et al. | 455/574 |
| 2006/0240799 A1* | 10/2006 | Kim et al. | 455/343.2 |
| 2007/0206524 A1 | 9/2007 | Suk | |
| 2007/0211688 A1* | 9/2007 | Park et al. | 370/347 |
| 2007/0218939 A1* | 9/2007 | Lim et al. | 455/528 |
| 2008/0070642 A1* | 3/2008 | Wang et al. | 455/574 |
| 2008/0075026 A1* | 3/2008 | Son et al. | 370/311 |

FOREIGN PATENT DOCUMENTS

| | | |
|---|---|---|
| EP | 1 511 342 A1 | 3/2005 |
| JP | 11-313370 A | 11/1999 |
| JP | 2003-179539 A | 6/2003 |
| JP | 2007-166676 A | 6/2007 |
| KR | 10-2007-0051999 A | 5/2007 |

OTHER PUBLICATIONS

Chulsik Yoon, Jaeheung Kim, Kunmin Yeo, Changes on Sleep Mode SDLs and MSCs, IEEE C802. 16e-04/11r1, The IEEE 802. 16 Working Group on Broadband Wireless Access Standards, Jan. 27, 2004.

Hang Zhang, Mo-Han Fong, Peiying Zhu, Wen Tong, Support of Short Data Burst Transmission to/from an MSS in Sleep Mode or Idle Mode, IEEE C802. 16e-04/538, The IEEE 802. 16 Working Group on Broadband Wireless Access Standards, Nov. 4, 2004.

* cited by examiner

METHOD FOR OPERATING CONTROL SLEEP MODE IN A COMMUNICATION SYSTEM

DETAILED DESCRIPTION OF INVENTION

1. Technical Field

The present invention relates generally to a communication system, and in particular, to a method for controlling a sleep mode operation in a communication system.

2. Background Art

Generally, communication systems are developing to provide Mobile Stations (MSs) with services capable of high-speed, high-capacity data transmission/reception. A typical example of the communication systems can include an Institute of Electrical and Electronics Engineers (IEEE) 802.16e communication system. The IEEE 802.16e communication system always maintains communication between an MS and a Base Station (BS) in a normal mode operation.

In the IEEE 802.16e communication system, an MS monitors the DownLink (DL) to determine whether data is received from a BS, even when the BS has no data to transmit to the MS, causing power consumption of the MS.

Meanwhile, the IEEE 802.16e communication system is a system that considers mobility of MSs. Therefore, the MS's power consumption affects mobility of MSs. A scheme for minimizing the MS's power consumption may include a scheme in which the MS can operate in a sleep mode. FIG. 1 is a diagram illustrating a process of performing an operation for a sleep mode in a communication system.

Referring to FIG. 1, when an MS 100 desires to transition from an existing awake mode to a sleep mode, the MS 100 transmits a MOBile_SLeeP-REQuest (MOB_SLP-REQ) message to a BS 110 in step 101. Upon receipt of the MOB_SLP-REQ message, the BS 110 determines whether it will approve the mode transition to the sleep mode of the MS 100, considering states of the BS 110 itself and the MS 100, and transmits a MOBile_SLeeP-ReSPonse (MOB_SLP-RSP) message to the MS 100 according to the determined results in step 103. Herein, the MOB_SLP-RSP message includes listening interval (or listening window) parameters. When the BS 110 has data to transmit to the MS 100 in the listening interval of the sleep mode, the BS 110 can transmit a MOBile_TRaFfic-INDication (MOB_TRF-IND) message including an identifier of the MS 100 to the MS 100 for the listening interval.

Upon receipt of the MOB_SLP-RSP message from the BS 110, the MS 100 starts a sleep mode operation according to the MOB_SLP-RSP message. Here, the MS 100 operates in the sleep mode considering the listening interval parameters included in the MOB_SLP-RSP message. When the MS 100 has data to transmit to the BS 110 while operating in the sleep mode, the MS 100 immediately transitions from the sleep mode to the awake mode.

If the BS 110 transmits a MOB_TRF-IND message not including an identifier of the MS 100 in the listening interval of the MS 100 in step 105, the MS 100 decodes the received MOB_TRF-IND message, and then operates back in the sleep mode, determining that its own identifier is not included.

Thereafter, when the BS 110 has data to transmit to the MS 100, the BS 110 transmits a MOB_TRF-IND message including an identifier of the MS 100 in step 107. The MS 100 decodes the MOB_TRF-IND message, and then transitions to the awake mode and receives data from the BS 110, determining that its own identifier is included.

After the data transmission/reception of the MS 100 and the BS 110 is completed, the MS 100 exchanges again a MOB_SLP-REQ message and a MOB_SLP-RSP message in order to transition back to the sleep mode.

As described above, in order for the MS 100 to transition to the sleep mode, it must exchange the MOB_SLP-REQ message and the MOB_SLP-RSP message with the BS 110. For the transmission/reception of the messages, the MS 100 consumes resources of the UpLink (UL) and the downlink, causing power consumption of the MS 100. In order to transmit the MOB_SLP-REQ message, the MS 100 should be allocated a bandwidth and, to this end, transmits a Bandwidth Request (BW-REQ) message to the BS 110.

Meanwhile, the MOB_SLP-REQ message includes therein a Power_Saving_Class_Type field and a Traffic_Triggered_Wakening_Flag (TTWF) field. The Power_Saving_Class_Type field is defined as the following types.

1) Type 1: The MS transitions to the awake mode when data transmission/reception occurs in the listening interval, or when it receives a MOB_TRF-IND message including a positive indication.

2) Type 2: The MS has a fixed sleep window (or fixed sleep interval), and transmits/receives data in the listening interval. After the fixed sleep window, the MS transmits/receives data in the next listening interval.

3) Type 3: While Type 1 and Type 2 provide that the MS continually maintains the sleep mode unless it receives a mode transition request message, Type 3 means a class in which the MS ends the sleep mode after one sleep mode operation.

The TTWF field is applied only to Type 1. More specifically, TTWF is used when the MS desires to maintain the sleep mode even though data occurs in the listening interval. That is, when TTWF=0, the MS transmits/receives data for the listening interval, and operates back in the sleep mode at the time the listening interval expires, i.e., at the time the sleep window begins.

The MS ends the sleep mode and transitions to the awake mode, when the BS desires to transmit a Medium Access Control (MAC) Service Data Unit (SDU) for a corresponding power saving class for the listening interval, when the MS transmits a BW-REQ message for a connection for a corresponding power saving class, or when the MS receives from the BS a MOB_TRF-IND message including an identifier of the MS. In addition, the MS can end the sleep mode through transaction of the MOB_SLP-REQ message and the MOB_SLP-RSP message.

However, for TTWF=1, the MS ends the sleep mode and transitions to the awake mode, when the MS receives a Packet Data Unit (PDU) from the BS for the listening interval, receives a MOB_SLP-RSP message meaning an end of the sleep mode, or receives a DL Sleep Control Extended Subheader. In addition, the MS ends the sleep mode and transitions to the awake mode, even when data occurs in the MS itself, or the MS transmits a MOB_SLP-REQ message or a BW-REQ message indicating the end of the sleep mode, and a UL Sleep Control Header to the BS. In other words, for TTWF=1, the MS transitions to the awake mode, when traffic occurs for the listening interval, or a management message occurs.

As described above, when the MS desires to maintain the sleep mode, the time has not been definitely proposed, at which the MS intends to transition back to the sleep mode after the listening interval expires. Further, the TTWF value is initially preset in the MOB_SLP-REQ message and the MOB_SLP-RSP message that the MS exchanges with the BS. However, in some cases, it is necessary to change the TTWF value while performing the sleep mode operation, and a detailed operation for changing the TTWF value has not been proposed.

DISCLOSURE

Technical Problem

Therefore, an object of the present invention is to provide a method for controlling a sleep mode operation in a communication system.

Another object of the present invention is to provide a sleep mode operation control method for reducing resource waste in a communication system.

Further another object of the present invention is to provide a sleep mode operation control method for reducing power consumption of an MS in a communication system.

Technical Solution

According to one aspect of the present invention, there is provided a method for controlling a sleep mode operation by a Mobile Station (MS) in a communication system. The MS includes transitioning to an awake state in a listening interval of the sleep mode; performing any one of a first operation, a second operation and a third operation in the awake state; and after any one operation is performed, transitioning to a sleep state upon detecting that there is no data to transmit to the BS and there is no data to be received from the BS; wherein the first operation is a process of receiving data from the BS, the second operation is a process of transmitting data to the BS, and the third operation is a process of receiving data from the BS and receiving data from the BS.

According to another aspect of the present invention, there is provided a method for controlling a sleep mode operation by a Base Station (BS) in a communication system. The BS includes recognizing that a Mobile Station (MS) has entered an awake state in the sleep mode; after recognizing that the MS has entered the awake state, performing any one of a first operation, a second operation and a third operation; and after any one operation is performed, recognizing that the MS has transitioned to a sleep state upon detecting that there is no data to transmit to the MS and there is no data to be received from the MS; wherein the first operation is a process of transmitting data to the MS, the second operation is a process of receiving data from the MS, and the third operation is a process of transmitting data to the MS and receiving data from the MS.

According to further another aspect of the present invention, there is provided a method for controlling a sleep mode operation by a Mobile Station (MS) in a communication system. The MS includes transmitting to a Base Station (BS) a first message including a Variable Listening Interval Indicator to transition from an awake mode to the sleep mode; transitioning to an awake state as the MS has reached a listening interval while the MS was staying in a sleep window of the sleep mode; and performing any one of a first operation, a second operation and a third operation in the awake state according to the Variable Listening Interval Indicator; wherein the first operation is a process of receiving data from the BS, the second operation is a process of transmitting data to the BS, and the third operation is a process of receiving data from the BS and transmitting data to the BS.

According to further another aspect of the present invention, there is provided a method for controlling a sleep mode operation by a Base Station (BS) in a communication system. The BS includes receiving a first message including a Variable Listening Interval Indicator from a Mobile Station (MS); transmitting to the MS a second message including the Variable Listening Interval Indicator in response to the received first message; and performing any one of a first operation, a second operation and a third operation according to the Variable Listening Interval Indicator after recognizing that the MS has entered an awake state as the MS has reached a listening interval while the MS was staying in a sleep window of the sleep mode; wherein the first operation is a process of transmitting data to the MS, the second operation is a process of receiving data from the MS, and the third operation is a process of transmitting data to the MS and receiving data from the MS.

Advantageous Effects

As described above, the present invention proposes a sleep mode operation control method for power consumption reduction in a communication system, and the control method controls a sleep mode operation between the MS and the BS by operating timers proposed by the present invention, thus contributing to a reduction in power consumption.

DETAILED DESCRIPTION OF EMBODIMENTS OF THE INVENTION

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The present invention provides a method for controlling a sleep mode operation in a communication system. Although a method for controlling a sleep mode operation will be described herein for one MS and a BS, the present invention can be applied even to the case where a plurality of MSs exist.

The MS's transition to the sleep mode is determined by transmission/reception of a MOBile_SLeeP-REQuest (MOB_SLP-REQ) message and a MOBile_SLeeP-ReSPonse (MOB_SLP-RSP) message. The sleep mode includes a sleep window and a listening interval, and when transmitting/receiving the MOB_SLP-REQ message and the MOB_SLP-RSP message, the MS determines the time it will enter the sleep mode, a length of the sleep window, and a length of the listening interval. Further, a wait state where the MS consumes power due to data transmission/reception between the MS and the BS is defined as an awake state, and a state where the MS transmits and receives no data to/from the BS for power consumption reduction is defined as a sleep state. The awake state and the sleep state both correspond to one state of the sleep mode. That is, the sleep mode is divided into an awake state corresponding to a listening interval, and a sleep state corresponding to a sleep window (i.e., a non-listening interval).

Regarding the data transmission/reception between the MS and the BS, it is assumed that the BS performs data transmission to the MS after transmitting a MOB_TRF-IND message to the MS. However, the data transmission method for power consumption reduction, proposed below by the present invention, can be applied even to the case where the BS performs data transmission/reception without transmitting the MOB_TRF-IND message.

Figure 1:
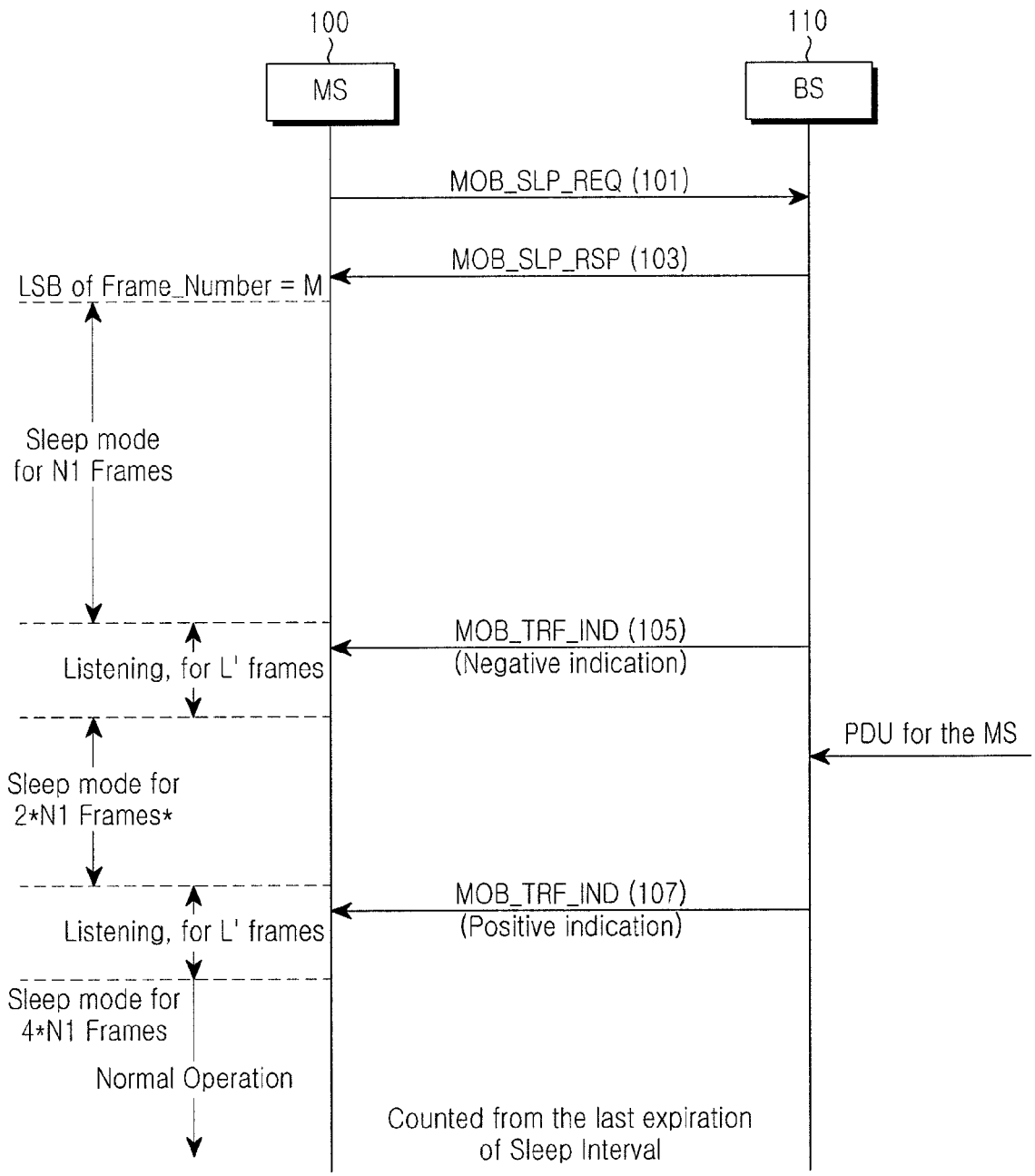
FIG. 1 is a diagram illustrating a process of performing an operation for a sleep mode in a communication system.
Figure 2:
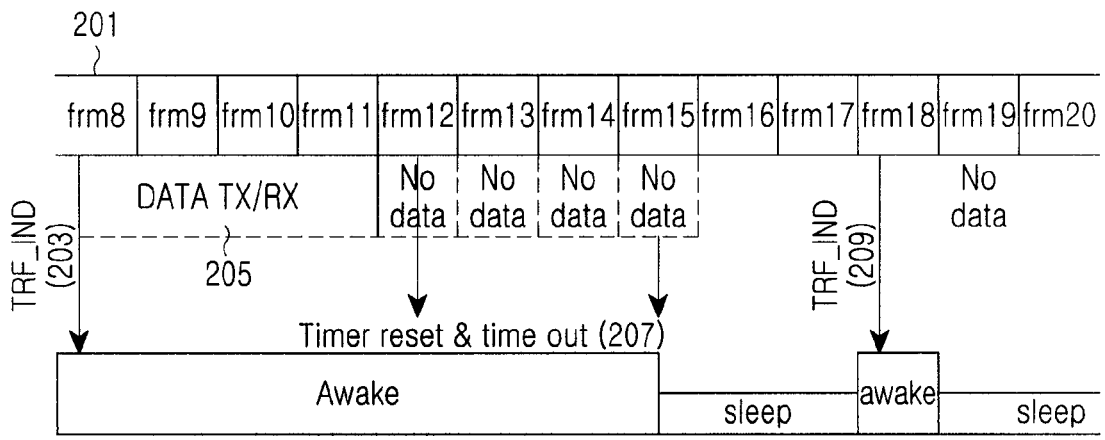
FIG. 2 is a diagram illustrating an operation for transmitting data by a BS in a communication system according to an embodiment of the present invention.

FIG. 2 is a diagram illustrating a data transmission/reception operation between a BS and an MS in a communication system according to an embodiment of the present invention.

Referring to FIG. 2, an MS transmits a MOB_SLP-REQ message to a BS for its transition to the sleep mode, and receives a MOB_SLP-RSP message from the BS, thereby determining the time it will enter the sleep mode, a length of a sleep window, and a length of a listening interval. It is assumed herein that through exchange of the MOB_SLP-REQ message and the MOB_SLP-RSP message between the MS and the BS, a length of the sleep window is determined as 8 frames and a length of the listening interval is determined as 2 frames. Further, it is assumed that frames are enumerated from #0 to #N (201). A BS recognizes that in frame #0 through frame #7, the MS is in a sleep window of the sleep mode. In frame #8, the BS transmits a MOB_TRF-IND message including an identifier of the MS as it has data to transmit to the MS (203). After transmitting the MOB_TRF-IND message, the BS transmits data to the MS (205). Otherwise, when the BS transmitted the MOB_TRF-IND message to the MS, the MS transmits data to the BS (205), if the MS has data to transmit to the BS after recognizing the transmission of the MOB_TRF-IND message.

Meanwhile, when the MS has no data to be received from the BS and the MS also has no data to transmit to the BS, it starts a timer T1. The timer T1 can be applied even when the MS has no data to receive from the BS, but it has data to transmit to the BS. In addition, the timer T1 can be applied even when the MS has data to be received from the BS, but it has no data to transmit to the BS. Therefore, the timer T1 is reset to 0 when data transmission/reception between the BS and the MS occurs. Thereafter, the timer T1 is counted beginning from frame #12, and increases by 1 every frame. Thus, in frame #15, the timer T1 becomes 4 (207).

In FIG. 2, it is assumed that a threshold of the timer T1 is determined as 4. Under this assumption, the MS enters the sleep mode in frame #16. That is, when a value of the timer T1 becomes the threshold, the MS operates in the sleep state beginning from the next frame (frame #16) of the corresponding frame (frame #15) that became the threshold.

Figure 3:
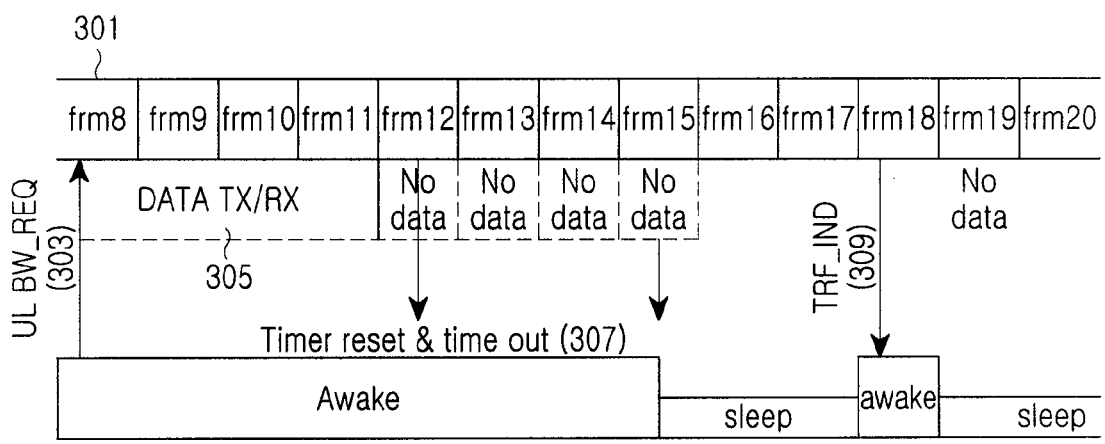
FIG. 3 is a diagram illustrating an operation for transmitting data by an MS in a communication system according to an embodiment of the present invention.

FIG. 3 is a diagram illustrating a data transmission/reception operation between a BS and an MS in a communication system according to an embodiment of the present invention.

Referring to FIG. 3, an MS transmits a UL Bandwidth Request (UL-BW-REQ) message to a BS in frame #8 (303). The frame #8 corresponds to a listening interval.

Thereafter, the MS and the BS exchange data (305). The MS and the BS exchange no data in frame #12 through frame #15. Accordingly, a timer T1 is counted beginning at frame #12, and a value of the timer T1 becomes 4 in frame #15 (307). Herein, a threshold of the timer T1 is determined as 4.

When a threshold of the timer T1 exceeds 4, the MS enters the sleep mode.

Figure 4:
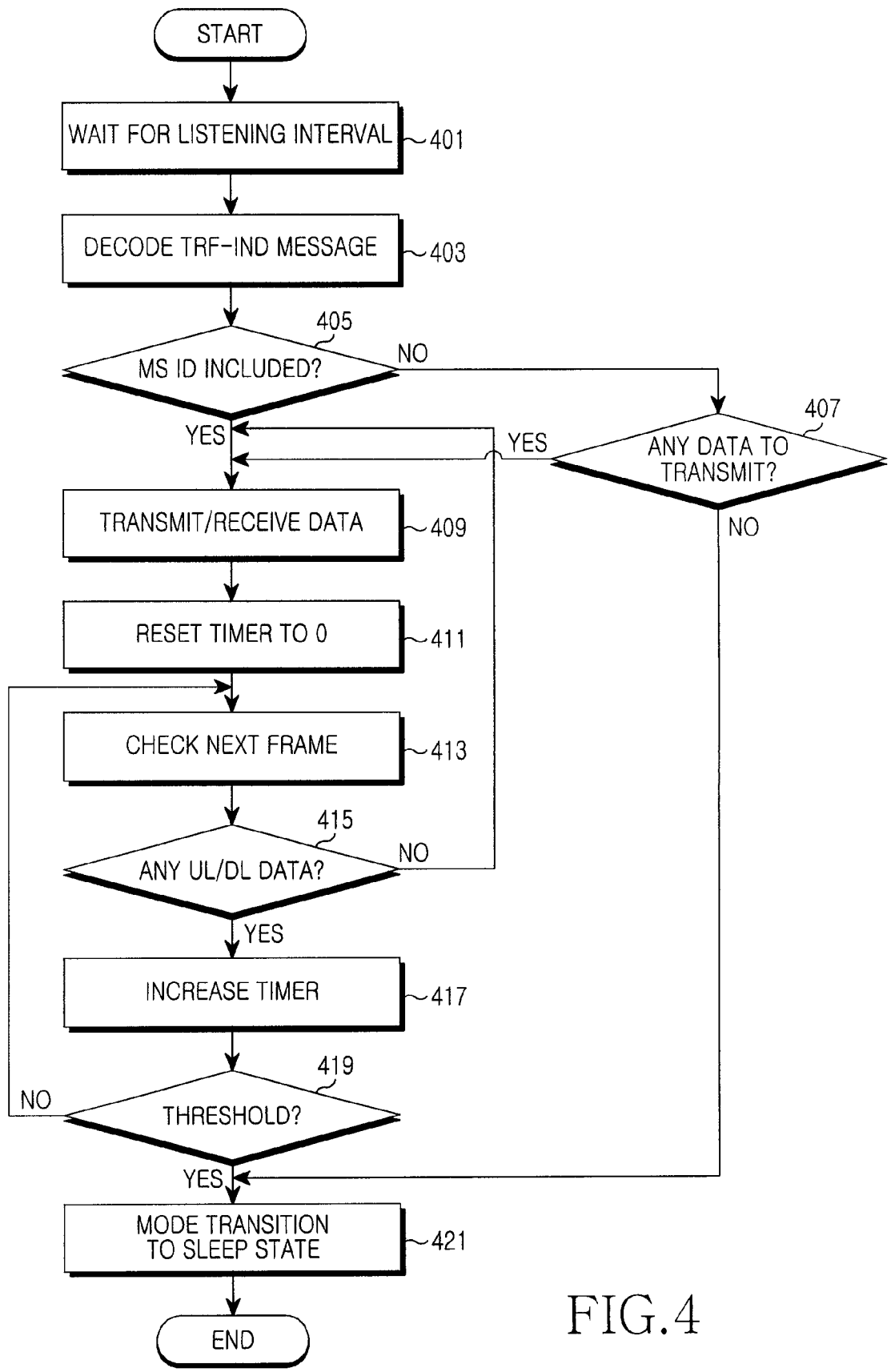
FIG. 4 is a diagram illustrating an operation of an MS in a communication system according to an embodiment of the present invention.

FIG. 4 is a diagram illustrating a process of performing a sleep mode-related operation by an MS in a communication system according to an embodiment of the present invention.

Referring to FIG. 4, in step 401, an MS, which was staying in a sleep window of a sleep mode, enters a listening interval. In step 403, the MS receives a MOB_TRF-IND message from a BS, and decodes the MOB_TRF-IND message. In step 405, the MS determines whether an identifier of the MS itself is included in the MOB_TRF-IND message. If an identifier of the MS is included, the MS proceeds to step 409, and if an identifier of the MS is not included, the MS proceeds to step 407. If an identifier of the MS is included, the MS proceeds to step 409 where it receives data from the BS and then proceeds to step 411. However, if an identifier of the MS is not included, the MS proceeds to step 407 where it checks an uplink buffer to determine whether there is data to transmit to the BS. If the MS has data to transmit, the MS proceeds to step 409. In step 409, the MS transmits data to the BS, and then proceeds to step 411.

In step 411, the MS sets a timer T1 when data transmission/reception between the MS and the BS is performed. In step 413, the MS checks if it has data to transmit and receive in the next frame, and then proceeds to step 415. If the MS has no data to transmit to the BS and also has no data to be received from the BS as the data transmission/reception between the MS and the BS is completed, the MS increases the timer T1 by 1 in step 417. If the timer T1 set by the MS reaches a preset threshold in step 419, the MS proceeds to step 421 where it transitions to the sleep mode. However, if the MS has data to transmit to the BS and also has data to be received from the BS in step 415, the MS repeatedly performs step 409 and its succeeding steps. If there is no data the MS will transmit to the BS in step 407, the MS immediately proceeds to step 421 where it transitions to the sleep state.

Figure 5:
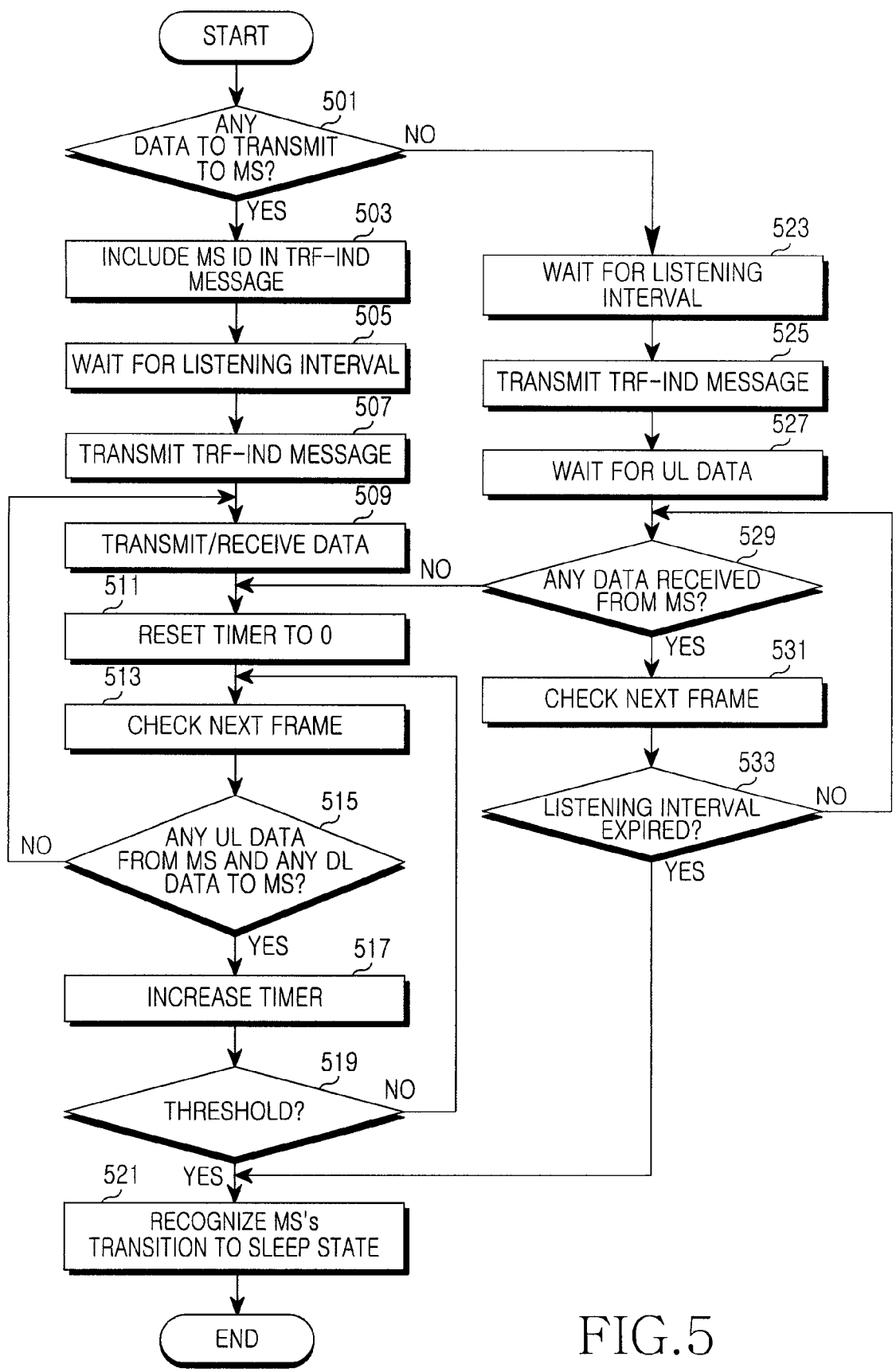
FIG. 5 is a diagram illustrating an operation of a BS in a communication system according to an embodiment of the present invention.

FIG. 5 is a diagram illustrating a process of performing a sleep mode-related operation by a BS in a communication system according to an embodiment of the present invention.

Referring to FIG. 5, a BS determines in step 501 whether it has data to transmit to an MS. If the BS has data to transmit to the MS, the BS proceeds to step 503, and if the BS has no data to transmit, the BS proceeds to step 523. In step 503, the BS includes an identifier of the MS in a MOB_TRF-IND message. In step 505, the BS waits for a listening interval. In step 507, the BS transmits the MOB_TRF-IND message to the MS. In step 509, the BS exchanges data with the MS. In step 511, the BS resets a timer to 0 while transmitting data to the MS. In step 513, the BS determines whether it has data to transmit/receive in the next frame, for data transmission/reception between the BS and the MS. If there is no data to transmit to the MS in step 515, the BS proceeds to step 517 where it increases a value of the timer T1, set in the previous step, by 1. In step 519, the BS determines whether the timer T1 has reached a threshold. If the timer T1 has reached the threshold, the BS proceeds to step 521 where it recognizes that the MS has transitioned to the sleep state.

Meanwhile, in step 523, the BS waits for a listening interval. In step 525, the BS transmits a MOB_TRF-IND message not including an identifier of the MS in the listening interval. In step 527, the BS waits for uplink traffic in the listening interval or the next listening interval. If the BS receives no data from the MS in step 529, the BS proceeds to step 531 where it checks the next frame to determine whether there is data to transmit and receive, and then proceeds to step 533. If the listening interval has expired, the BS proceeds to step 521 where it recognizes that the MS has transitioned to the sleep state. If the listening interval has not expired in step 533, the BS proceeds to step 529 where it waits for uplink traffic from the MS.

If data is received at the BS from the MS in step 529, the BS proceeds to step 511. A description will now be made of a method for controlling a sleep mode operation using a timer T2 and a timer T3 which are different from the timer T1.

A BS transmits data to an MS after transmitting a MOB_TRF-IND message to the MS in a listening interval. At this time, the BS initializes a timer T2 and a timer T3 to 0. The timer T2 is a timer used for determining that an MS has no data to receive from a BS, or that the BS has no data to transmit to the MS. The timer T3 is a timer used for determining that the MS has no data to transmit to the BS, or that the BS has no data to receive from the MS.

The timer T2 and the timer T3 are reset to 0 during data transmission/reception between the BS and the MS. When the data the MS will receive from the BS does not exist for 4 frames, or when the data the BS will transmit to the MS does not exist for 4 frames, the timer T2 increases from 0 up to a preset threshold of 4. Similarly, when the data the MS will transmit to the BS does not exist for 4 frames, or when the data the BS will receive from the MS does not exist for 4 frames, the timer T3 increases from 0 up to a preset threshold of 4. The MS transitions to the sleep mode when data transmission/reception is not performed, even though the timer T2 and the timer T3 both have reached the threshold of 4.

Next, a description will be made of a second embodiment that provides a method for applying the sleep mode scheme described in the first embodiment to Power_Saving_Class_Type 1 in which a value of a Traffic_Triggered_Wakening_Flag (TTWF) field included in each of a MOB_SLP-REQ message and a MOB_SLP-RSP message is '0'.

The TTWF is used when the MS desires to main the sleep state even though data occurs in the listening interval. That is, in the second embodiment, the listening interval is fixed, the proposed embodiment can perform data transmission/reception for the listening interval while repeating the sleep window and the listening interval, and can perform an operation of maintaining the listening interval when the listening interval is variable as described in the first embodiment, i.e., while data transmission/reception happens. The above two operations will be referred to herein as a 'new sleep mode operation'.

The following parameter will be newly defined for control of a sleep mode operation between the BS and the MS. The parameter is added, in the form of Type/Length/Value (TLV) Encoding, to a REGistration-REQuest (REG-REQ) message and a REGistration-RSPonse (REG-RSP) message that the MS exchanges with the BS during its network entry. The added TLV Encoding can be defined as Table 1.

TABLE 1

| Type | Length | Value | Scope |
|---|---|---|---|
| X | 1 | Support of new sleep mode with variable listening interval<br>0x00: Not Support (default)<br>0x01: Support | REG-REQ/RSP |

When the added TLV Encoding is omitted from the REG-REQ message and the REG-RSP message during its transmission/reception, its default value is regarded as '0'. When a Variable Listening Interval Indicator (VLII) of the TLV Encoding field is transmitted after being set as '0x00', it means that the new sleep mode operation cannot be performed. A detailed description of the VLII will be made below.

More specifically, the BS capable of supporting the new sleep mode operation determines whether the MS can perform the new sleep mode operation. If the MS cannot perform the new sleep mode operation, the BS transmits the REG-RSP message without including the TLV Encoding, or sets the VLII parameter as '0x00' when it transmits a MOB_SLP-RSP message later.

On the other hand, when the MS can perform the new sleep mode operation and the BS cannot perform the new sleep mode operation, the MS transmits the REG-REQ message without including TLV Encoding, or sets the VLII parameter as '0x00' when it transmits a MOB_SLP-REQ message later.

Herein, the TLV Encoding can be transmitted/received using another message other that the REG-REQ message or the REG-RSP message, for example, a Subscriber Station Basic Capability REQuest (SBC-REQ) message or a Subscriber Station Basic Capability RSPonse (SBC-RSP) message.

Meanwhile, for the new sleep mode operation of Power_Saving_Class_Type 1 with TTWF=0, the following messages should be proposed in the present invention.

(1) MOB_SLP-REQ message

A MOB_SLP-REQ message newly proposed by the present invention is a message that the MS transmits to the BS, when the MS desires to transition from the existing awake state to the sleep state. A format of the MOB_SLP-REQ message is shown in Table 2.

TABLE 2

| Syntax | Size | Notes |
|---|---|---|
| MOB_SLP-REQ_Message_format ( ) | — | — |
| { | | |
| Management message type=50 | 8 bits | — |
| Number of Classes | 8 bits | Number of power saving classes |
| for (i=0; i<Number_of_Classes; i++) | — | — |
| { | | |
| Definition | 1 bit | — |
| Operation | 1 bit | — |
| Power_saving_Class_ID | 6 bits | — |
| if (Operation == 1) | — | — |
| Start_frame_number | 7 bits | — |
| reserved | 1 bit | — |
| } | | |
| if (Definition = 1) { | — | — |
| Power_Saving_Class_Type | 2 | — |
| Direction | 2 | — |
| TRF-IND_Required | 1 | — |
| Traffic_triggered_wakening_flag | 1 | — |
| Variable_Listening_Interval_Indicator | 1 | — |
| Reserved | 1 | — |
| initial-sleep window | 8 | — |
| Listening window | 8 | — |
| final-sleep window base | 10 | — |
| final-sleep window exponent | 3 | — |
| Number_of_CIDs | 3 | — |
| for (i=0; i<Number_of_CIDs; i++) | — | — |
| { | | |
| CID | 16 | — |
| } | | |
| } | | |
| } | | |
| TLV encoded information | variable | — |

As shown in Table 2, the MOB_SLP-REQ message, unlike the conventional MOB_SLP-REQ message, includes a VLII field. The VLII field has the following two meanings:

VLII=0: The MS and the BS perform data transmission/reception for a listening interval of a fixed length. When the listening interval expires, the MS maintains the sleep state until before the next listening interval.

VLII=1: The MS and the BS perform data transmission/reception for a variable listening interval. That is, the MS and the BS transmit/receive data in the listening interval, and when there is data to continually transmit/receive, the listening interval is extended. When data transmission/reception is not performed for a predetermined time after the data transmission/reception is completed, the MS maintains the sleep state until before the next listening interval.

(2) MOB_SLP-RSP Message

A MOB_SLP-RSP message newly proposed by the present invention is a message that the BS transmits to the MS by transmitting to the MS a message including information indicating whether it will approve the MS's transition to the sleep mode considering states of the BS itself and the MS, or by defining unsolicited instruction. The MOB_SLP-RSP message includes therein parameters, i.e., Information Elements (IEs), that the MS needs to operate in the sleep mode, and a format of the MOB_SLP-RSP message is shown in Table 3.

TABLE 3

| Syntax | Size | Notes |
|---|---|---|
| MOB_SLP-RSP_Message_format ( ) { | — | |
| Management message type=51 | 8 bits | — |
| Number of Classes | 8 bits | Number of power saving classes |
| for (i=0; i<Number_of_Classes; i++) | — | — |
| { | | |
| Length of Data | 7 bits | |
| Sleep Approved | 1 bit | |
| Definition | 1 bit | — |
| Operation | 1 bit | |
| Power_Saving_Class_ID | 6 bits | — |
| if (Sleep Approved == 1) { | — | — |
| if (Operation = 1) { | — | — |
| Start_frame_number | 7 bits | |
| Stop_CQI_Allocation_Flag | 1 bit | |
| } | | |
| if (Definition = 1) { | — | — |
| initial sleep window | 8 | — |
| listening window | 8 | |
| final-sleep window base | 10 | |
| final-sleep window exponent | 4 | |
| Traffic_triggered_wakening_flag | 1 | |
| Power_Saving_Class_Type | 2 | |
| Direction | 2 | |
| TRF-IND_Required | 1 | |
| Variable_Listening_Interval_Indicator | 1 | |
| Number_of_CIDs | 4 | |
| for (i=0; i<Number_of_CIDs; i++) | — | |
| { | | |
| CID | 16 | |
| } | — | |
| if (TRF-IND required) { | — | |
| SLPID | 10 | |
| Reserved | 2 | |
| } | | |
| if (MDHO or FBSS capability enabled) { | — | If MDHO or FBSS capability is enabled in the REG-REQ/RSP message exchange. |
| Maintain Diversity Set and Anchor BS | 1 | |
| if (Maintain Diversity Set and Anchor BS) { | — | |
| MDHO/FBSS duration(s) | 3 | |
| } | — | |
| } | — | |
| } | — | |
| Padding | variable | If needed for alignment to byte boundary |
| } else { | — | In case sleep approved == 0 |
| REQ-duration | 8 | |
| } | | |
| } | — | |
| TLV encoded information | variable | |
| } | | |

As shown in Table 3, the MOB_SLP-RSP message includes a VLII field as in Table 2.

A value of the VLII field is determined according to whether the BS can support the new sleep mode. If the BS cannot support the new sleep mode, the VLII field is always set to '0' during its transmission.

Also, when the BS can support the new sleep mode but the TTWF is set to '1', a value of the VLII field is determined as '0'. Further, a value of the VLII field is determined as '0', even when it is determined that the MS cannot perform the new sleep mode during its network entry. Likewise, a value of the VLII field is determined as '0', even when the MS has recognized that it cannot support the new sleep mode by a 'Support of new sleep mode with variable listening Interval TLV encoding' method during its network entry.

Next, a description will be made of a timer that the MS has proposed in order to transition to the awake state.

The MS and the BS determine that VLII=1, by transmitting and receiving the MOB_SLP-REQ message and the MOB_SLP-RSP message, and it will be assumed that the BS and the MS both have recognized that they can operate in the new sleep mode. The MS and the BS recognize an end time of the variable listening interval proposed in the new sleep mode and a transition time to the sleep state by starting the following timers.

(1) Timer in MS for New Sleep Mode (Timer_in_MS_for_NEW_SLM): This timer is a timer that an MS manages. The timer starts from the next frame of the frame where the listening interval has expired, which was acquired by a MOB_SLP-REQ message and a MOB_SLP-RSP message that the MS transmitted and received to/from the BS, and the timer is reset every time the MS receives data from the BS in the corresponding frame. When the MS has received the MOB_TRF-IND message, the MS transitions to the sleep state if an identifier of the MS is not included in the MOB_TRF-IND message. If the timer expires, the MS transitions to the sleep state in the listening interval, and maintains the sleep state until the next listening interval begins.

(2) Timer in BS for New Sleep Mode (Timer_in_BS_for_New_SLM): This timer is a timer that the BS manages. The timer is counted every frame, and is reset whenever the BS receives data from the MS in the corresponding frame. If the timer expires and there is no data that the BS will transmit to the MS, the BS, even though data is generated, does not transmit the generated data until the MS awakes in the next listening interval, recognizing that the MS has transitioned to the sleep state.

Herein, a unit of the timer can be time or the number of frames. If a unit of the timer is the number of frames, and the maximum expiry time is assumed to be 5 frames, the timer expires when there is no data the MS will transmit to the BS, for an interval of the 5 frames.

Meanwhile, for TTWF=0 and VLII=1, in order for the power saving class to be ended, i.e., in order for the MS to leave the sleep mode, transmission/reception of the MOB_

SLP-REQ and MOB-SLP-RSP messages, and deactivation of Bandwidth and UL Sleep Control Header, and DL Sleep Control Extended Subheader are used.

Further, the MS transitions to the sleep state, when the timer expires or there is no data to transmit/receive. However, when the MS desires to transition to the sleep state before the timer expires, or when the BS intends to make the MS transition to the sleep state, the MS can transition to the sleep state by transmitting/receiving the MOB_SLP-REQ message and the MOB_SLP-RSP message.

The BS can also allow the MS to transition to the sleep state, using the management message. In this case, it is meant that the BS sets the management message with an unsolicited indication before transmission.

The exceptional situations in the foregoing second embodiment will now be described.

1. The BS Receives a BW-REQ Message from the Ms in the Sleep Window

In the following description, it will be assumed that the MS is staying in the sleep state of the sleep mode. That is, the BS recognizes that the MS cannot transmit/receive data as it stays in the sleep state. However, now assume the situation that the MS should transmit data to the BS, for example, due to the occurrence of an emergency situation, or though data has occurred that the MS will transmit from a start time of the listening interval, the time required until the MS receives a UL burst grant from the BS after CDMA code ranging is longer than the listening interval. Accordingly, the MS can transmit the BW-REQ message to the BS, even though the MS itself stays in the sleep state.

The BS determines whether it will grant the MS's data transmission. If the BS grants the MS's data transmission, the BS starts Timer_in_BS_for_NEW_SLM. That is, the BS waits for data to be received from the MS immediately after starting the Timer_in_BS_for_NEW_SLM.

Similarly, when the BS grants the MS's data transmission, i.e., when the MS has received a UL burst grant from the BS, the MS waits for data to be received from the BS immediately after it transmits data to the BS through the UL burst and starts Timer_in_MS_for_NEW_SLM.

When the MS stays in the sleep state, the MS can transmit the BW-REQ message immediately or in the next listening interval, at the discretion of the MS.

2. The MS Cannot Receive Basic Map (DL-MAP/UL-MAP)

The MS waits for data to be received from the BS after starting Timer_in_MS_for_NEW_SLM in the listening interval. That is, the BS transmits data after transmitting the basic MAP (DL-MAP/UL-MAP) to the MS.

Meanwhile, when there is data to be exchanged between the BS and the MS at the time the listening interval expires, the MS can extend the listening interval and exchange data with the BS. In some cases, however, the MS may not receive the basic MAP that the BS transmitted, throughout the extended listening interval. In this case, the MS cannot determine whether the BS has transmitted data to the MS. Thus, the MS will transition to the sleep state, determining that the BS has no data to transmit.

However, in this case, the MS extends an interval for which it stays in the listening interval, by temporarily resetting Timer_in_MS_for_NEW_SLM before transitioning to the sleep state. The MS may extend the interval for which it stays in the listening interval, by resetting the Timer_in_MS_for_NEW_SLM only when it cannot receive only the DL-MAP in the basic MAP from the BS.

3. The MS Cannot Receive SUB-DL-UL-MAP

The BS can transmit to the MS a maximum of 3 SUB-DL-UL-MAPs using not the basic MAP, but a Compressed MAP. That is, the BS can apply different Modulation and Coding Scheme (MCS) levels to the 3 SUB-DL-UL-MAPs before transmitting them to the MS. The MS can decode any one or all of the maximum of SUB-DL-UL-MAPs according to its channel state. If the MS couldn't receive or decode all the SUB-DL-UL-MAPs that the BS transmitted, throughout the listening interval, the MS can extend the interval for which it stays in the listening interval, by resetting the Timer_in_MS_for_NEW_SLM.

In other words, if the MS cannot decode the Compressed MAP, the MS cannot also decode the SUB-DL-UL-MAPs. Therefore, the MS can extend the interval for which it stays in the listening interval by resetting the Timer_in_MS_for_NEW_SLM, even when the MS couldn't decode the Compressed MAP that the BS transmitted.

4. No Response Message to the Data that the BS Transmitted is Received from the MS For example, the BS can transmit data to the MS, and wait for a feedback message from the MS by starting Timer_in_BS_for_NEW_SLM in a communication system employing Automatic Repeat Request (ARQ). The MS can determine whether the data that the BS transmitted has been normally received or abnormally received, and transmit ACK or NACK message to the BS according to the determination. However, in some cases, the MS may not transmit the ACK or NACK message to the BS due to its poor channel state or power shortage. In this case, the Timer_in_BS_for_NEW_SLM started by the BS expires.

In addition, even though the BS has another data to transmit to the MS, since it receives no ACK or NACK message from the MS, the BS can stop the data transmission to the MS and resume the data transmission in the next listening interval.

Meanwhile, when the BS allocated a Channel Quality Indication Channel (CQICH) to the MS, the BS can stop the data transmission to the MS even though information on the CQICH, the amount of which corresponds to a preset number, is not transmitted to the BS.

When the MS does not transmit UL data even though the BS has allocated UL resources to the MS, the BS considers that the MS is in the abnormal state. Therefore, even though the BS has data to transmit to the MS in the current listening interval, the BS performs the data transmission in the next listening interval.

In a third embodiment described below, the VLII is included in the MOB_SLP-REQ message and the MOB_SLP-RSP message in the form of TLV Encoding.

The TLV Encoding can be defined in a TLV encoded information IE in the MOB_SLP-REQ message and the MOB_SLP-RSP message in the form of Table 4.

TABLE 4

| Type | Length | Value | Scope |
|------|--------|-------|-------|
| X | 1 | Power Saving Class ID: 6 bits<br>Variable Listening Interval Indicator: 1 bit<br>Reserved: 1 bit (LSB) | SLP-REQ/RSP |

As shown in Table 4, a Power Saving Class ID is included in the TLV encoded information IE, and the TLV Encoding indicates existence/nonexistence of the VLII for the Power Saving Class ID.

Next, a fourth embodiment will be described. In the fourth embodiment described below, the BS and the MS perform the same operation as that of the second embodiment. However, an operation of the timer proposed in the second embodiment is different.

If the MS can perform the new sleep mode, TLV encoding shown in Table 5 can be included in the REG-REQ message together with the 'Support of new sleep mode with variable listening Interval TLV encoding' proposed in the second embodiment.

TABLE 5

| Type | Length | Value | Scope |
|---|---|---|---|
| X | 1 | Timer_in_MS_for_New_SLM (unit: frame) | REG-REQ/RSP |

If only the 'Support of new sleep mode with variable listening Interval TLV encoding' is included in the REG-REQ message, and the TLV encoding of Table 5 is not included in the message, it is considered that a default is requested.

Accordingly, the BS checks the REG-REQ message that the MS transmitted, and includes 'Support of new sleep mode with variable listening Interval TLV encoding' and TLV encoding shown in Table 6 in a REG-RSP message corresponding to the REG-REQ message before transmission.

TABLE 6

| Type | Length | Value | Scope |
|---|---|---|---|
| Y | 1 | Timer_in_MS_for_New_SLM (unit: frame) | REG-REQ/RSP |

As shown in Table 6, as for a value of the Timer_in_MS_for_NEW_SLM, the BS can include the value that the MS requested in the MOB_SLP-REQ message, and the BS can include a value different from the value requested by the MS within an allowed range supported by the BS. The value of the Timer_in_MS_for_NEW_SLM is set greater than a value of the Timer_in_BS_for_NEW_SLM managed by the BS, before its transmission.

Meanwhile, when the BS transmits the REG-RSP message to the MS, it can include only the 'Support of new sleep mode with variable listening Interval TLV encoding' without including the Timer_in_MS_for_NEW_SLM encoding. In this case, the MS should consider that the timer is started with a preset value, recognizing that the Timer_in_MS_for_NEW_SLM encoding is not included after decoding the REG-RSP message.

In addition, the timer proposed in the fourth embodiment can be differently set for each power saving class. That is, a different timer value can be set for each data pattern, or connection, that belongs to the power saving class. TLV encoding that has proposed the setting can be defined as Table 7.

TABLE 7

| Type | Length | Value | Scope |
|---|---|---|---|
| Z | 2 | Power Saving Class ID: 6 bits<br>Variable Listening Interval Indicator: 1 bit<br>Timer_in_MS_for_New_SLM: 8 bits<br>Reserved: 1 bit (LSB) | SLP-REQ/RSP |

As shown in Table 7, the TLV encoding is included only for the power saving class in which the MS and the BS can perform or support the new sleep mode, and TTWF in the MOB_SLP-REQ message and the MOB_SLP-RSP message is set to '0'. The MS may request Timer_in_MS_for_NEW_SLM.

Alternatively, in the second embodiment, the VLII can be included in the MOB_SLP-REQ message and the MOB_LSP-RSP message in the parameter form, which is different from the TLV encoding form. In this case, the timer can be defined in the TLV form shown in Table 8, before its transmission. That is, if the VLII is transmitted in the parameter form, the timer is transmitted in the following TLV form.

TABLE 8

| Type | Length | Value | Scope |
|---|---|---|---|
| K | 2 | Power Saving Class ID: 6 bits<br>Timer_in_MS_for_New_SLM: 8 bits<br>Reserved: 2 bits (LSB) | SLP-REQ/RSP |

It is also possible to provide information on a value of the timer the MS manages, by including TLV shown in Table 8 for the power saving class in which the TTWF is set to '0' and the VLII is set to '1'.

In the present invention, the MS can awake in a listening interval previously negotiated with the BS. However, in a superframe structure including a plurality of frames, when the negotiated listening interval is not included in the first frame, the MS can awake not only in the negotiated listening interval but also in the first frame.

Similarly, in a communication system using the superframe structure according to the present invention, a basic unit in which the MS transitions to the sleep state, and a basic unit corresponding to the listening interval become a superframe. That is, the frame where the MS transitions to the sleep state becomes the first frame of the superframe, and the frame where the MS awakes in the listening interval also becomes the first frame of the superframe. Even if the MS does not transition to the sleep state in the first frame of the superframe, the time at which the MS awakes in the listening interval should become the first frame of the superframe.

The following embodiment is proposed to resolve the problem which may occur when the MS and the BS simultaneously request the sleep mode. That is, in order to distinguish the MOB_SLP-REQ message transmitted by the MS in an unsolicited manner, the BS adds the following parameters as well as the previously shown parameters of Table 2, to the MOB_SLP-RSP message.

Unsolicited Indication

The unsolicited indication parameter is set to '1' when the BS transmits the MOB_SLP-RSP message to the MS in an unsolicited manner.

As another embodiment, instead of Sleep_Approved described in Table 2, the following parameter is included in the MOB_SLP-RSP message.

Response Code

The response code parameter indicates whether the MOB_SLP-RSP message is a certain response to a request from the MS, or is transmitted in an unsolicited manner. In other words, when a value of the response code is '0', it means that the BS transmits the MOB_SLP-RSP message to the MS in an unsolicited manner. When the value is '1', it indicates Approval for the MOB_SLP-REQ message that the MS transmitted. When the value is '2', it indicates Rejection for the MOB_SLP-REQ message that the MS transmitted.

In order to indicate that the MOB_SLP-RSP message is transmitted in an unsolicited manner, other types of unsolicited indication parameters other than the foregoing parameters can be used. When it is recognized by the unsolicited indication parameter that the MS and the BS simultaneously request the sleep mode, one of the following two operations can be performed according to system setup, system designer's selection, definition of the standard, or other criteria.

First, when a request of the MS is prioritized, the BS responds to the MOB_SLP-REQ message from the MS, disregarding the Unsolicited MOB_SLP-RSP message that the BS itself transmitted. The MS also waits for the BS to retransmit a proper MOB_SLP-RSP message in response to its MOB_SLP-REQ message, disregarding the Unsolicited MOB_SLP-RSP message.

Next, when a request of the BS is prioritized, the BS considers that the MS performs a sleep mode operation in response to the MOB_SLP-RSP message from the BS, abandoning the MOB_SLP-REQ message that the MS itself transmitted. The MS operates according to parameters in the Unsolicited MOB_SLP-RSP message that the BS transmitted.

In the following modified embodiment, a condition for ending the variable listening interval is defined separately for the BS and the MS. That is, the starting conditions of the timers to extend the listening interval are as follows.

Starting Condition of Timer_in_MS_for_New_SLM

In the second embodiment described above, when the MS receives DL data from the BS for a listening interval, or receives a positive indication through a MOB_TRF-IND message, the MS starts the timer at the time that the listening interval expires. On the contrary, in the following embodiment, the MS immediately starts the timer, when it receives DL data from the BS for the listening interval, or receives a positive indication through the MOB_TRF-IND message.

This embodiment is equal to the second embodiment in the condition in which the timer is reset. Additionally, the timer is reset even when an ARQ ACK or HARQ ACK is received for the UL traffic. If a NACK-based ARQ scheme is used, an ARQ NACK, not an ARQ ACK, is used for resetting the timer, and if the NACK-based HARQ scheme is used, an HARQ NACK is used for resetting the timer. As a result, when the MS can know that the BS is normally operating, the listening interval is extended.

Starting Condition of Timer_in_BS_for_New_SLM

In the second embodiment described above, when the BS receives UL data from the MS for the listening interval, the BS starts the timer at the time that the listening interval expires. On the contrary, in the following embodiment, the BS immediately stats the timer when it receives UL data from the MS for the listening interval.

This embodiment is equal to the second embodiment in the condition in which the timer is reset. Additionally, the timer is reset even when ARQ ACK or HARQ ACK is received for the DL traffic. If the NACK-based ARQ scheme is used, an ARQ NACK, not an ARQ ACK, is used for resetting the timer, and if the NACK-based HARQ scheme is used, an HARQ NACK is used for resetting the timer. As a result, when the BS can know that the MS is normally operating, the listening interval is extended.

In the following modified embodiment, for the timers for extending the listening interval, conditions for making transition to the sleep state is defined as follows.

Transition Condition to Sleep State by Timer_in_MS_for_New_SLM

In the foregoing second embodiment, when the timer Timer_in_MS_for_New_SLM expires, the MS transitions to the sleep state if there is no data to transmit to the BS. In this case, however, if UL traffic continually exists in the MS, the MS always awake, increasing its battery consumption. Therefore, in the following embodiment, the MS transitions to the sleep state, if the timer expires and the number of HARQ retransmission retries or the number of ARQ retransmission retries is exhausted. Thus, existence/nonexistence of the UL traffic that the MS will transmit does not affect the MS's transition to the sleep state. That is, if the number of retransmission retries is exhausted, the MS transitions to the sleep state, determining that the MS cannot normally receive ACK from the BS and there is no DL traffic. If the number of retransmissions reaches a predetermined maximum limit, the MS determines that the number of retransmission retries has been exhausted.

Transition Condition to Sleep State by Timer_in_BS_for_New_SLM

Meanwhile, when the timer Timer_in_BS_for_New_SLM expires, the BS waits until the number of HARQ or ARQ retransmission retries is exhausted. Thereafter, if the number of HARQ retransmission retries or the number of ARQ retransmission retries is exhausted, the BS considers that the MS has transitioned to the sleep state. Similarly, existence/nonexistence of the DL traffic that the BS will transmit to the MS does not affect the condition in which it is considered that the MS transitions to the sleep state.

In another modified embodiment, the starting conditions of the timers to extend the listening interval are defined as follows.

The MS immediately starts the timer Timer_in_MS_for_New_SLM, when it receives DL data from the BS for the listening interval, or receives ACK (HARQ ACK or ARQ ACK) for the UL data. The BS immediately starts the timer Timer_in_BS_for_New_SLM, when it receives UL data from the MS for the listening interval, or receives ACK for the DL data.

In further another modified embodiment, the starting conditions of the timers to extend the listening interval are defined as follows.

The MS immediately starts the timer Timer_in_MS_for_New_SLM, when it receives DL data from the BS for the listening interval or receives ACK (HARQ ACK or ARQ ACK) for the UL traffic, or when it is allocated a UL burst as a Grant after transmitting BW-REQ to the BS. The BS immediately starts the timer Timer_in_BS_for_New_SLM, when it receives UL data from the BS for the listening interval or receives ACK (HARQ ACK or ARQ ACK) for the DL traffic, or when it allocates a UL burst as a Grant upon receiving BW-REQ from the MS.

As another modified embodiment, in addition to the above-stated starting conditions for the timers to extend the listening interval, the MS considers the case where it receives a positive indication from the BS through the MOB_TRF-IND message. That is, the MS immediately starts the timer Timer_in_MS_for_New_SLM, when it receives a positive indication from the BS through the MOB_TRF-IND message.

In a modified embodiment, when the BS does not transmit a MOB_TRF-IND message as there is no DL traffic to transmit to the MSs to which it has expected to transmit the MOB_TRF-IND message for the listening interval, the BS includes the following fields in a DL-MAP message in order to notify the MSs of the non-transmission.

Transmission of MOB_TRF-IND

When the field is set to '0', it means that the BS does not transmit the MOB_TRF-IND message, i.e., that there is no DL traffic for the MSs which are waiting for the MOB_TRF-IND message while awaking for the listening interval. Depending on the situations, for example, when there is no UL traffic, the MSs, which have recognized the field, immediately transition to the sleep state regardless of a length of the remaining listening interval, and awake again in the next listening interval. When the field is set to '1', the MSs wait for the MOB_TRF-IND message as in the existing operation.

This field can be transmitted in the form of TLV encoding in DL-MAP, or transmitted in the form of a 1-bit indicator which is inserted in a superframe header.

When the MS awakes from the sleep mode, it is necessary to check a frame number to determine whether the MS has awoken at the correct frame. When the superframe is used and one superframe is composed of a plurality of frames, a frame number or superframe number is checked only through a superframe header located in the first frame of the superframe. However, when the sleep mode operation is achieved on a frame-by-frame basis, the MS may not recognize the frame number as it cannot immediately receive the superframe header. Therefore, when the superframe structure is used, the sleep mode operation should be accomplished on a superframe-by-superframe basis. That is, the listening interval should be located beginning at the first frame of the superframe. However, it is not necessary that a length of the listening interval increases to a multiple of the superframe.

To this end, in the MOB_SLP-REQ/RSP message, start_frame_number indicating a position of the frame where the sleep window begins is set to indicate the first frame of the superframe. For example, in the start_frame_number are set 6 Least Significant Bit (LSB) bits of a superframe number identifying the superframe, or 6 LSB bits of a frame number identifying the first frame of the superframe.

A step size of the sleep window is defined as [superframe length×N], where the superframe length means the number of frames included in one superframe, for example, 4 frames. Therefore, in order to indicate a length of the sleep window, N or 4×N is included in an "initial-sleep window" field or another field of the MOB_SLP-REQ/RSP message.

When a sum of one sleep window and one listening interval are called a sleep cycle in the sleep mode, the listening interval is included in every sleep cycle. Therefore, if a starting position of the sleep window, which indicates a start of the sleep cycle, is designated as the first frame of the superframe, and a unit length of the sleep window is designated as a multiple of the superframe length, the listening interval is always located in the first frame of a certain superframe even though the length of the sleep window is doubled. As a result, when the MS awakes in the listening interval, it can make reference to the frame number in order to determine whether the MS itself has awoken at the correct time.

According to the new sleep mode operation of the present invention, the listening interval is extended by the timers started in the BS and the MS while they continuously receive data, or receive ACK. In this case, the extended listening interval can eventually reach the next scheduled listening window, meaning that timers of both the BS and the MS are continually reset due to data and/or ACK. Then the MS and the BS apply again the new sleep mode operation in the next scheduled listening window, determining that the extended listening interval has expired. According to the application result, the next scheduled listening window can be a new extended listening interval. The term 'scheduled listening interval' as used herein means the listening interval which was originally determined by the parameters indicated by the MOB_SLP-REQ/RSP message.

Particularly, at an initial operation of the sleep mode, since a length of the sleep window is relatively short, there is high probability that the extended listening window will reach the next scheduled listening window. If such a situation is repeated several times, in which after the extended listening interval has expired, a newly started listening interval is extended again, i.e., if the extended listening interval continually occurs several times, it is meaningless that the MS continually maintains the sleep mode.

Therefore, the following embodiment uses a threshold for checking the number of consecutive extended listening intervals. When the listening interval extended according to the new sleep mode operation of the present invention reaches the next scheduled listening window, the MS determines whether the number of consecutive extended listening intervals has reached the threshold. The new extended listening interval is included or omitted in counting the number of consecutive extended listening intervals. When the number of consecutive extended listening intervals is less than the threshold, the MS maintains the sleep mode. On the contrary, when the number of consecutive extended listening intervals has reached the threshold, the MS transitions from the sleep mode to the normal mode, determining that it no longer needs to maintain the sleep mode. The BS also determines whether the MS maintains the sleep mode, or transitions to the normal mode, using the same algorithm as that of the MS.

If the MS has reached the next scheduled listening window without transitioning to the normal mode, the timers used for extending the listening interval is restarted after being stopped. For example, if data exchange occurs in the state where the timers are stopped, the timers for extending the listening timers are restarted by the conditions described in the foregoing embodiments.

The invention claimed is:

1. A method for controlling a sleep mode operation by a mobile station (MS) in a communication system, the method comprising:
    receiving, from a base station (BS), a first message that includes data from which a listening interval is detected;
    detecting a listening interval based at least in part on the data included in the first message;
    operating in an awake state according to the listening interval;
    detecting that the listening interval has expired;
    in response to detecting that the listening interval has expired, starting a timer for counting a time interval upon detecting that the listening interval has expired; and
    maintaining the awake state until the timer expires.

2. The method of claim 1, further comprising:
    receiving a second message for mobile traffic indication while the MS operates in the awake state; and
    transitioning to a sleep state if an identifier of the MS is not included in the second message.

3. The method of claim 1, further comprising:
    transitioning to a sleep state if the timer expires.

4. The method of claim 3, further comprising:
    transmitting a third message for requesting bandwidth to the BS while the MS operates in the awake state; and
    resetting the timer and waiting for data to be received from the BS.

5. The method of claim 1, further comprising:
    temporarily resetting the timer before the timer expires.

6. The method of claim 5, wherein the temporarily resetting of the timer before the timer expires comprises temporarily resetting the timer before the timer expires, if the MS does not receive data from the BS.

7. The method of claim 6, wherein the data includes at least one of a downlink-MAP (DL-MAP), an uplink-MAP (UL-MAP), and a SUB-DL-UL-MAP.

8. The method of claim 1, further comprising:
receiving information indicating whether the MS and the BS perform data transmission/reception for a variable listening interval before detecting that the listening interval has expired,
wherein the timer starts if the information indicates that the MS and the BS perform data transmission/reception for the variable listening interval.

9. A method for controlling a sleep mode operation of a mobile station (MS) by a base station (BS) in a communication system, the method comprising:
transmitting, to the MS, a first message that includes data from which a listening interval is detected by the MS;
starting a timer for counting a time interval in response to the BS detecting that the listening interval has expired;
resetting the timer whenever a second message is received from the MS;
if the timer has expired and there is no data to be transmitted to the MS, recognizing that the MS operates in a sleep state; and
stopping data transmission for the MS until the MS transitions to an awake state according to a listening interval.

10. The method of claim 9, further comprising:
transmitting information indicating whether the MS and the BS perform data transmission/reception for a variable listening interval before starting the timer.

11. The method of claim 9, wherein the second message is a message for requesting bandwidth.

12. A mobile station (MS) in a communication system, the MS comprising:
a timer configured to count a time interval;
a receiver configured to receive, from a base station (BS), a first message that includes data from which a listening interval is detected; and
a control unit configured to detect a listening interval based at least in part on the data included in the first message, to operate in an awake state based on the listening interval, to detect that the listening interval has expired, to start, in response to detecting that the listening interval has expired, the timer upon detecting that the listening interval has expired, and to maintain the awake state until the timer expires.

13. The MS of claim 12, wherein the receiver is configured to receive a second message for mobile traffic indication while the MS operates in the awake state, and
wherein the control unit is configured to transition to a sleep state if an identifier of the MS is not included in the second message.

14. The MS of claim 12, wherein the control unit is configured to transition to a sleep state if the timer expires.

15. The MS of claim 14, further comprising:
a transmitter configured to transmit a third message for requesting bandwidth to the BS while the MS operates in the awake state,
wherein the control unit is configured to reset the timer and to wait for data to be received from the BS.

16. The MS of claim 12, wherein the control unit is configured to temporarily reset the timer before the timer expires.

17. The MS of claim 16, wherein the control unit is configured to temporarily reset the timer before the timer expires, if the MS does not receive data from the BS.

18. The MS of claim 17, wherein the data includes at least one of a downlink-MAP (DL-MAP), an uplink-MAP (UL-MAP), and a SUB-DL-UL-MAP.

19. The MS of claim 12, wherein the receiver is configured to receive information indicating whether the MS and the BS perform data transmission/reception for a variable listening interval before detecting that the listening interval has expired, and
wherein the timer is configured to start if the information indicates that the MS and the BS perform data transmission/reception for the variable listening interval.

20. A base station (BS) in a communication system, the BS comprising:
a timer is configured to count a time interval; and
a control unit configured to:
transmit, to a mobile station (MS), a first message that includes data from which a listening interval is detected by the MS;
start the timer in response to the BS detecting that the listening interval has expired;
reset the timer whenever a second message is received from the MS;
recognize that the MS operates in a sleep state if the timer has expired and there is no data to be transmitted to the MS; and
stop data transmission for the MS until the MS transitions to an awake state based on the listening interval.

21. The BS of claim 20, further comprising:
a transmitter configured to transmit information indicating whether the MS and the BS perform data transmission/ reception for a variable listening interval before starting the timer.

22. The BS of claim 20, wherein the second message is a message for requesting bandwidth.

\* \* \* \* \*